(12) United States Patent
Elwell et al.

(10) Patent No.: US 8,527,814 B1
(45) Date of Patent: Sep. 3, 2013

(54) METHOD AND SYSTEM FOR REPAIRING AN ERROR IN A SOFTWARE APPLICATION

(75) Inventors: Joseph Elwell, San Diego, CA (US);
Cary D. E. Evans, Encinitas, CA (US);
Marianne Y. Lu, Encinitas, CA (US);
Alan F. Buhler, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 308 days.

(21) Appl. No.: 12/910,736

(22) Filed: Oct. 22, 2010

(51) Int. Cl.
*G06F 11/00* (2006.01)
*G06F 9/44* (2006.01)

(52) U.S. Cl.
USPC ............... 714/38.1; 714/2; 714/25; 717/124; 717/127; 717/131

(58) Field of Classification Search
None
See application file for complete search history.

(56) References Cited

U.S. PATENT DOCUMENTS

| | | | | |
|---|---|---|---|---|
| 5,897,630 A | * | 4/1999 | Schneider Huddleston Virta et al. | 706/45 |
| 7,523,340 B2 | * | 4/2009 | Muthukumarasamy et al. | 714/2 |
| 2004/0153823 A1 | * | 8/2004 | Ansari | 714/38 |
| 2005/0086630 A1 | * | 4/2005 | Chefalas et al. | 717/100 |
| 2008/0262860 A1 | * | 10/2008 | Schneider et al. | 705/1 |
| 2009/0222811 A1 | * | 9/2009 | Faus et al. | 717/173 |
| 2011/0264964 A1 | * | 10/2011 | Murphy et al. | 714/48 |

\* cited by examiner

*Primary Examiner* — Lewis A. Bullock, Jr.
*Assistant Examiner* — Mark Gooray
(74) *Attorney, Agent, or Firm* — Osha Liang LLP

(57) ABSTRACT

A method for repairing an error in a software application, including receiving an error including an error description detailing the error, identifying, using a plurality of commands, a network address of a client computer executing the software application and a file system location on the client computer, transmitting, using the plurality of commands, an error tool file to the client computer at the network address, storing, using the plurality of commands, the error tool file on the client computer at the file system location, installing, using the plurality of commands, an error tool on the client computer using the error tool file, executing, using the plurality of commands, the error tool on the client computer, repairing the error in the software application after executing the error tool, and receiving feedback in the form of an execution log from the error tool.

25 Claims, 7 Drawing Sheets

METHOD AND SYSTEM FOR REPAIRING AN ERROR IN A SOFTWARE APPLICATION

BACKGROUND

An error tool or patch is a piece of software designed to fix errors in a software application. Patches may fix dysfunctional program code, security vulnerabilities, and improve the usability and/or performance of a software application. Error tools typically use a set distribution mechanism, where the developers of a software application identify an error (i.e. a bug) in the software application, develop a patch to address the error, and distribute the patch to the entire community of users of the software application, even those users that may not have encountered the error. Often times, the developers of a software application will post the patch on a web site, and require users to download, install, and execute the patch themselves, in a manual fashion. Therefore, the current system requires users to take part in the error repair mechanism, and is not selective as it usually affects a large number of users.

SUMMARY

In general, in one aspect, the invention relates to a method for repairing an error in a software application, comprising identifying a plurality of commands for repairing the error, receiving the error comprising an error description detailing the error, searching, using a processor and the plurality of commands, for the error description to identify an error identification (ID) number that categorizes the error, searching, using the processor and the plurality of commands, for the error ID number to identify an error tool file of an error tool that repairs the error, identifying, using the plurality of commands, a network address of a client computer executing the software application and a file system location on the client computer, transmitting, using the plurality of commands, the error tool file to the client computer at the network address, storing, using the plurality of commands, the error tool file on the client computer at the file system location, installing, using the plurality of commands, the error tool on the client computer using the error tool file, executing, using the plurality of commands, the error tool on the client computer, repairing the error in the software application after executing the error tool, and receiving feedback in the form of an execution log from the error tool.

In general, in one aspect, the invention relates to a system for repairing an error in a software application, comprising a processor; an error tool application executing on the processor and configured to identify a plurality of commands for repairing the error, receive the error comprising an error description detailing the error, search, using the plurality of commands, for the error description to identify an error identification (ID) number that categorizes the error, search, using the plurality of commands, for the error ID number to identify an error tool file of an error tool that repairs the error, identify, using the plurality of commands, a network address of a client computer executing the software application and a file system location on the client computer, transmit, using the plurality of commands, the error tool file to the client computer at the network address, store, using the plurality of commands, the error tool file on the client computer at the file system location, install, using the plurality of commands, the error tool on the client computer using the error tool file, execute, using the plurality of commands, the error tool on the client computer, repair the error in the software application after executing the error tool, and receive feedback in the form of an execution log from the error tool.

In general, in one aspect, the invention relates to a computer readable storage medium storing instructions for repairing an error in a software application, the instructions executable on a processor and comprising functionality for identifying a plurality of commands for repairing the error, receiving the error comprising an error description detailing the error, searching, using the plurality of commands, for the error description to identify an error identification (ID) number that categorizes the error, searching, using the plurality of commands, for the error ID number to identify an error tool file of an error tool that repairs the error, identifying, using the plurality of commands, a network address of a client computer executing the software application and a file system location on the client computer, transmitting, using the plurality of commands, the error tool file to the client computer at the network address, storing, using the plurality of commands, the error tool file on the client computer at the file system location, installing, using the plurality of commands, the error tool on the client computer using the error tool file, executing, using the plurality of commands, the error tool on the client computer, repairing the error in the software application after executing the error tool, and receiving feedback in the form of an execution log from the error tool.

Other aspects and advantages of the invention will be apparent from the following description and the appended claims.

DETAILED DESCRIPTION

Figure 1:
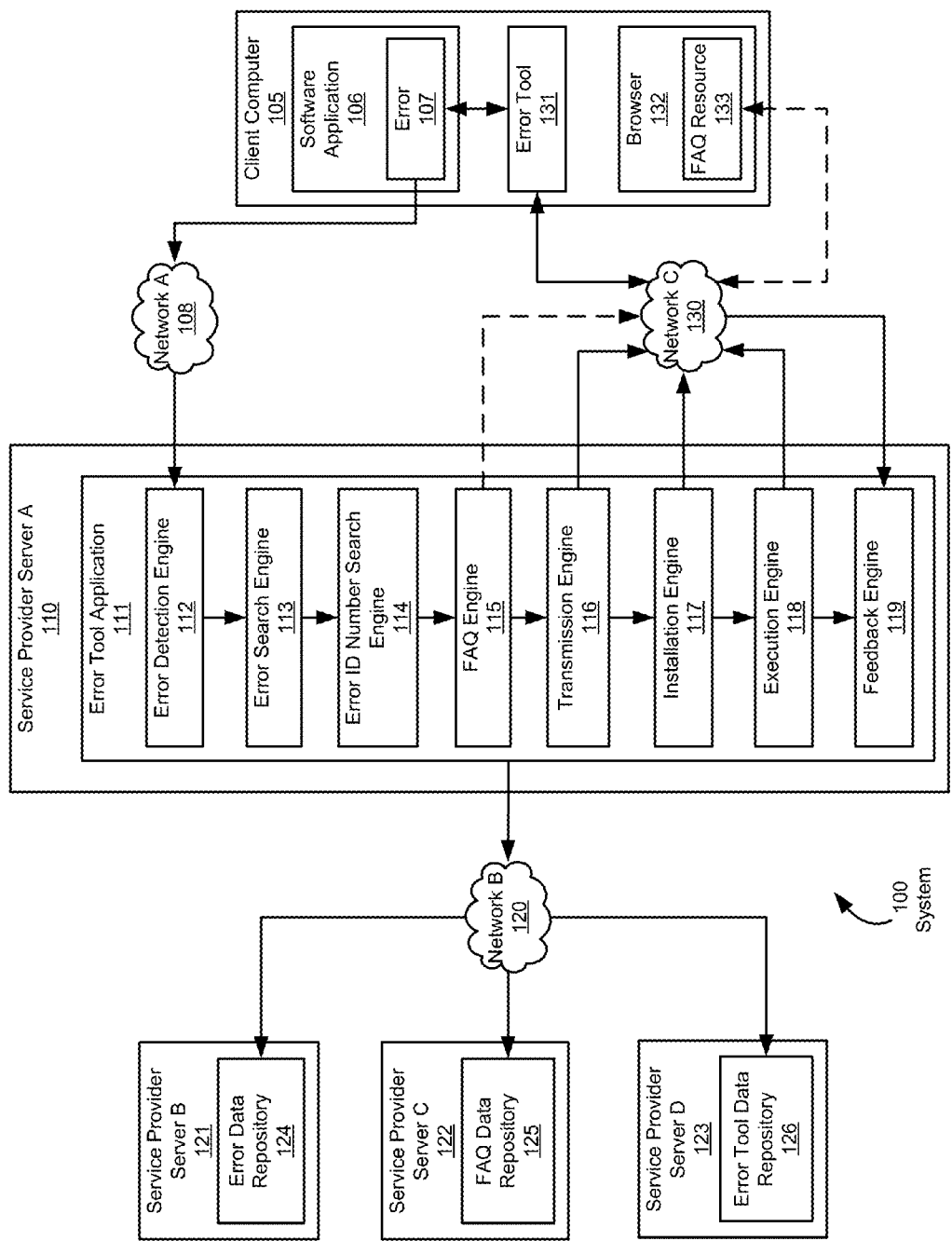
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for repairing an error in a software application (e.g. a financial application). Specifically, an error tool application may identify an error in a software application, identify an error tool that repairs the error, transmit the error tool to the computer that contains the error, install the error tool on the computer, and execute the error tool to repair the error. Identification of the error, transmission to, and installation and execution of the error tool on the client computer may be performed by the error tool application, without the intervention of a user of the software application. Those skilled in the art will appreciate that there may be various ways by which the invention may accomplish these tasks.

FIG. 1 shows system (100) in accordance with one or more embodiments of the invention. As shown in FIG. 1, system (100) includes components such as client computer (105), service provider server A (110), service provider server B (121), service provider server C (122), and service provider server D (123). Client computer (105) may contain software application (106), error tool (131), and browser (132). Service provider server A (110) may host error tool application (111), which in turn may include error detection engine (112), error search engine (113), error ID number search engine (114), FAQ engine (115), transmission engine (116), installation engine (117), execution engine (118), and feedback engine (119). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), a local area network (LAN)), with wired and/or wireless segments. In one or more embodiments of the invention, there may be more than one error tool application, error detection engine, error search engine, error ID number search engine, FAQ engine, transmission engine, installation engine, execution engine, and feedback engine running on a device, as well as more than one client computer and service provider server interfacing with those components. Those skilled in the art will appreciate that the term financial application (i.e., a software application that manages finances of a user and/or a business) is used throughout this description as an example of a software application; however, any type of software application may be used in the place of a financial application.

In one or more embodiments of the invention, client computer (105) is configured to run a software application. Specifically, client computer (105) is configured to display software application (106). A software application GUI (not shown) may display information associated with software application (106) and/or error tool application (111). The software application GUI may be viewed in a web browser, an application window, and the like. The software application GUI may be viewed in these display technologies by a user of software application (106) and/or error tool application (111). The software application GUI may include standard web elements, including video, audio, and text, as well as interface technologies not limited to text submission on forms, voice capture, and user gesture interpretation. In one or more embodiments of the invention there may be various other display technologies used to view the software application GUI.

In one or more embodiments of the invention, service provider server A (110) is configured to host error tool application (111), which is configured to fix an error of a software application. Specifically, error tool application (111) may fix error (107) of software application (106). Error tool application (111) is a software application that includes several engines configured to perform specific functions to fix an error of a software application. Specifically, engines operating as part of the error tool application (111) may include functionality to detect an error, search a data repository for an error ID, search a data repository for an error tool and related error tool file, identify a frequently asked questions (FAQ) resource, transmit the FAQ resource to a client computer, transmit an error tool file to a client computer, install the error tool and/or error tool file on the client computer, execute the error tool on the client computer to fix the error, receive feedback from the FAQ resource, receive feedback from the error tool, as well as perform other calculations associated with automatically (i.e. without human intervention and/or executed completely by a computer program) fixing an error in a software application. Error tool application (111) may receive input from various sources, including client computer (105). Error tool application (111) may store and/or access data in/from error data repository (124), FAQ data repository (125), and error tool data repository (126). Service provider server A (110), error tool application (111), and other data stored on service provider server A (110) may be owned and/or operated by a service provider (e.g., the owner, developer, and/or manager of the error tool application). Each engine of the error tool application (111) is described below. Those skilled in the art will appreciate that each of the engines described may have other functionality beyond that disclosed, and that the functionality of each engine may alternatively be performed by any of the other engines.

In one or more embodiments of the invention, error detection engine (112) is configured to detect an error. Specifically, error detection engine (112) may receive error (107) from client computer (105) over network A (108). An error (i.e. software bug) is a flaw, mistake, failure, or fault in a computer program or system that produces an incorrect and/or an unexpected result. For example, error (107) may cause software application (106) to behave in unintended ways. Many bugs arise from mistakes made by programmers in a software program's source code and/or its design, while others are caused by compilers producing incorrect code. A software application that contains a large number of errors that critically interfere with its functionality is said to be buggy.

After receiving the error, error detection engine (112) may process (i.e. modify, transform, format) the error, and then transmit the error or a portion of the error to error search engine (113) for further processing. For example, error detection engine (112) may extract an error description from the error, and pass this on to error search engine (113). In parallel, error detection engine (112) may pass control of system (100) to another engine of error tool application (111). Error detection engine (112) may also receive credentials of a user of a software application and/or identification of the software application. Specifically, in one or more embodiments, software application (106) on client computer (105) may provide user credentials (e.g. social security number, username, password) to error tool application (111), which may then store this information internally in a user profile for use by the error tool application (111). Alternatively, software application (106) may provide identification (e.g. a serial number) of the software application for verification and/or authentication. Those skilled in the art will appreciate that error detection engine (112) may receive input from other entities beyond client computer (105) and software application (106), and may perform other functions beyond those disclosed.

In one or more embodiments of the invention, error search engine (113) is configured to identify an error identification (ID) number using an error description and/or an error. An error description is an alphanumeric string that uniquely identifies an error by naming its location (e.g. "root.ui.login"), the error message displayed to a user when the error occurs (e.g. "system has failed: error 57253489"), and by various other mechanisms. Error search engine (113) may receive the error description and/or error from error detection engine (112). Specifically, after receiving the error description and/or error, error search engine (113) may process (i.e., modify, transform, format) the error description and/or error, search for the error ID number using the error description and/or error, and then transmit the error ID number to error ID number search engine (114) for further processing. In parallel, error search engine (113) may pass control of system (100) to various other engines. Those skilled in the art will appreciate that error search engine (113) may receive the error description and/or error from other entities beyond error detection engine (112), and may perform other functions beyond those disclosed.

In one or more embodiments of the invention, error ID number search engine (114) is configured to identify an error tool using an error ID number. An error ID number is an alphanumeric code used to uniquely identify an error tool. For example, an error ID number "455902" may uniquely identify an error tool that fixes a login error in a tax application. Error ID number search engine (114) may receive an error ID number from error search engine (113). After receiving the error ID number, error ID number search engine (114) may process (i.e., modify, transform, format) the error ID number, identify an error tool and/or error tool file, and then provide identification of the error tool and/or error tool file to transmission engine (116) for further processing. Alternatively, error ID number search engine (114) may pass control of system (100) to FAQ engine (115). Those skilled in the art will appreciate that error ID number search engine (114) may receive an error ID number from other entities beyond error search engine (113), and may perform other functions beyond those disclosed.

In one or more embodiments of the invention, FAQ engine (115) is configured to identify and transmit a FAQ resource to a client computer. A FAQ resource is a web page or other document that provides a question and an answer to the question, as pertaining to an error in a software application. Specifically, a FAQ resource may include an error message, error ID number, and other means to uniquely identify an error, a screen shot of the error message and/or software application environment when the error occurs, possible causes of the error, and potential solutions to the error. In other words, a FAQ resource is a resource used to help a user manually fix an error in a software application. FAQ engine (115) may receive an indication that an error tool for a specific error does not exist in system (100) from error ID number search engine (114). After receiving this indication, FAQ engine (115) may identify a FAQ resource by searching through a data repository using an error ID number provided by error ID number search engine (114), and upon identification of the FAQ resource, may then transmit the FAQ resource to client computer (105) through a network, to be displayed to a user of a software application. Specifically, FAQ resource (133) may be displayed to a user of software application (106) in browser (132) over network C (130). Alternatively, FAQ engine (115) may pass control of system (100) to transmission engine (116), which may then transmit the FAQ resource to the client computer. Those skilled in the art will appreciate that FAQ engine (115) may receive input from other entities beyond error ID number search engine (114), and may perform other functions beyond those disclosed.

In one or more embodiments of the invention, transmission engine (116) is configured to transmit an error tool to a client computer. An error tool is a software application that repairs an error in a software application. An error tool may be in the form of an executable file that functions as a stand alone software program, or may be in the form of, for example, a dynamic linked library that plugs into a software library that may be executed by the library. Transmission engine (116) may receive identification of an error tool and/or error tool file from error ID number search engine (114). After receiving identification of an error tool and/or error tool file, transmission engine (116) may then transmit the error tool and/or error tool file to a client computer over a network. Specifically, transmission engine (116) may transmit error tool (131) to client computer (105) over network C (130). In parallel, transmission engine (116) may pass control of system (100) to installation engine (117), or another engine. Those skilled in the art will appreciate that transmission engine (116) may receive identification of an error tool and/or error tool file from other entities beyond error ID number search engine (114), and may perform other functions beyond those disclosed.

In one or more embodiments of the invention, installation engine (117) is configured to install an error tool on a client computer. The installation of an error tool in a software environment is the setup and configuration of that software program (i.e. the error tool) that renders it operable in that software environment (e.g. an operating system). Installation engine (117) may receive an indication that an error tool and/or error tool file has been transmitted to a client computer from transmission engine (116). After receiving an indication that an error tool and/or error tool file has been transmitted to a client computer, installation engine (117) may install the error tool and/or error tool file on the client computer in a remote fashion. For example, installation engine (117) may install error tool (131) on client computer (105) by executing a set of remote commands on client computer (105). Therefore, the installation of an error tool on a client computer may be performed without the intervention of a user of the software application, in a completely automated fashion. In parallel, installation engine (117) may pass control of system (100) to execution engine (118). Those skilled in the art will appreciate that installation engine (117) may receive an indication that an error tool has been transmitted to a client computer from other entities beyond transmission engine (116), and may perform other functions beyond those disclosed.

In one or more embodiments of the invention, execution engine (118) is configured to execute an error tool that has been installed on a client computer. The execution of an error tool in a software environment on a computer entails running that software program (i.e. the error tool) in that software environment. In other words, the functions of the error tool are performed upon execution. Execution engine (118) may receive an indication that an error tool and/or error tool file has been installed on a client computer from installation engine (117). After receiving an indication that an error tool and/or error tool file has been installed on a client computer, execution engine (118) may execute the error tool on the client computer in a remote fashion. For example, execution engine (118) may execute error tool (131) on client computer (105) by executing a set of remote commands on client computer (105) to fix error (107) in software application (106). Therefore, the execution of an error tool on a client computer may be performed without the intervention of a user of the software application, in a completely automated fashion. In parallel, execution engine (118) may pass control of system (100) to feedback engine (119). Those skilled in the art will appreciate that execution engine (118) may receive an indication that an error tool has been installed on a client computer from other entities beyond installation engine (117), and may perform other functions beyond those disclosed.

In one or more embodiments of the invention, feedback engine (119) is configured to receive feedback from a client computer. Specifically, feedback engine (119) may receive feedback from an error tool or a FAQ resource on a client computer. Feedback may contain an error log detailing an error, the error tool transmitted, installed, and executed on a client computer in the effort to fix the error, and the result of the execution of that error tool. Feedback may also contain user comments in response to a FAQ resource provided to a user in the effort to fix an error. Feedback may be received in a remote fashion. For example, feedback engine (119) may receive feedback from client computer (105) by executing a set of remote commands on client computer (105). Therefore, feedback may be received without the intervention of a user of the software application, in a completely automated fashion. After receiving feedback, feedback engine (119) may process (i.e., modify, transform, format) the feedback, and then store the feedback in a data repository. In parallel, feedback engine (119) may also alter an error tool and/or FAQ resource associated with an error. Specifically, the feedback may be appended to a FAQ resource and/or error tool, and an author of the FAQ resource and/or error tool may be informed of the feedback. Those skilled in the art will appreciate that feedback engine (119) may receive feedback from other entities beyond a client computer, and may perform other functions beyond those disclosed.

In one or more embodiments of the invention, service provider servers B (121), C (122), and D (123) are configured to host error data repository (124), FAQ data repository (125), and error tool data repository (126), respectively. Data repositories (124), (125), and (126) may contain data associated with error tool application (111). One or more of the data repositories may be a relational database that stores data entries associated with error tool application (111). One or more of the data repositories may also be a spreadsheet containing data cells associated with error tool application (111). In one or more embodiments of the invention the data repositories may be implemented with many technologies. Error data repository (124), FAQ data repository (125), and error tool data repository (126) may receive data from various sources, including error tool application (111), and any of the engines of error tool application (111), over network B (120). After receiving data from error tool application (111), each data repository may process (i.e., modify, transform, format) the data, and then store the data. Those skilled in the art will appreciate that error data repository (124), FAQ data repository (125), and error tool data repository (126) may receive and store data from other entities beyond error tool application (111), and may perform other functions beyond those disclosed. Further, service provider servers B (121), C (122), and D (123), and the data stored on these servers may be owned and/or operated by a service provider (e.g., the owner, developer, and/or manager of the error tool application).

Figure 2:
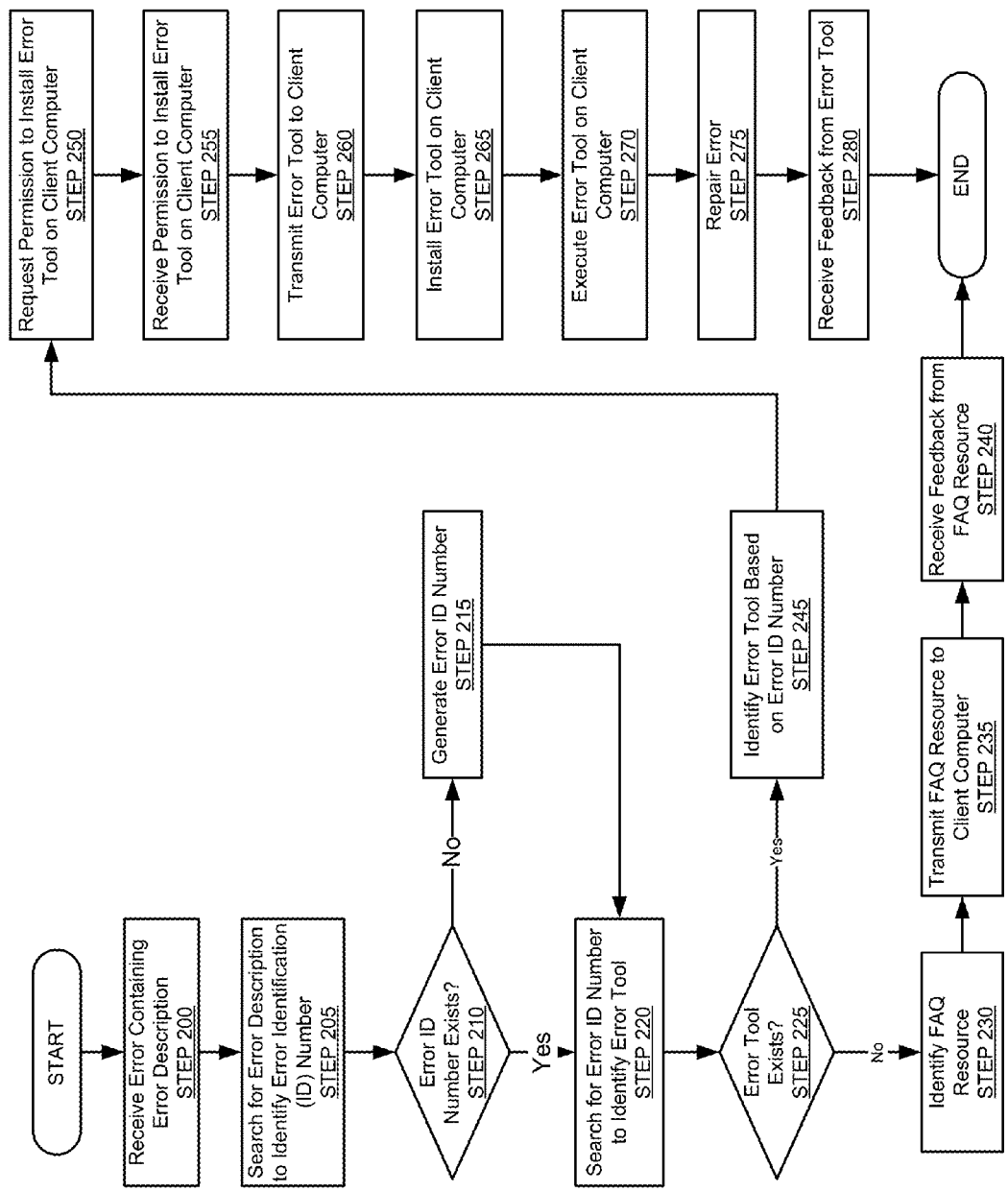
FIG. 2 shows a flowchart in accordance with one or more embodiments of the invention.

FIG. 2 shows a flowchart in accordance with one or more embodiments of the invention. The process shown in FIG. 2 may be used, for example, with system (100), to repair an error in a software application in an automated fashion (i.e. without the intervention of a user of the software application). The sequence of steps shown in FIG. 2 may differ among embodiments of the invention, and one or more of the steps may be performed in parallel and/or may be optional.

In STEP 200, an error containing an error description is received. For example, an error that does not allow a user to login to a software application may be encountered. The error may display the following error message to a user when the user attempts to login to the software application "Error 1102: Unable to login". The error description of the error may be the error message "Error 1102: Unable to login". The error description may also contain other information beyond that contained in the error message. Those skilled in the art will appreciate that, prior to STEP 200, a set of commands for repairing errors in the software application may be identified, and upon receiving the error the commands may be executed using the error as input. In other words, the commands may execute STEPS 200-280, without requiring a user to take part in the error repair process.

In STEP 205, the error description is used to search for and to identify an error identification (ID) number. For example, the error description "Error 1102: Unable to login" may be used as a search string, and a data repository may be searched with this search string, to identify an error ID number associated with this error description. Those skilled in the art will appreciate that, during the error ID number search process, the error description may be formatted, modified, and/or parsed to scrape portions of the error description. For example, if the complete error description "Error 1102: Unable to login" does not return a match during the search process, then the error description may be parsed to extract the substring "Error 1102". This substring may subsequently be used as a search string during the search for the error ID number. Ultimately, an error ID number will either be identified or will not.

In STEP 210, it is determined if the error ID number exists. If the error ID number does exist, then the process proceeds to STEP 220, otherwise it proceeds to STEP 215.

In STEP 215, an error ID number is generated. An error ID number is generated if it was not identified during the search process in STEP 210. The generation of the error ID number may follow certain pre-determined rules. For example, information relating to the software application version number, an error number obtained from the error description, the error message obtained from the error description, and other identifying data may be used to generate an error ID number. The generation of an error ID number based on a set of pre-determined rules may enable the system to be fault tolerant. For example, if the error ID number does not exist in the data repository search in STEP 205, but an error tool associated with the error obtaining in STEP 200 does in fact exist, then the generation of an error ID number based on a pre-defined rule set may allow the system to identify an error tool for the error, even though the error ID number could not be identified. Those skilled in the art will appreciate that there may be various other mechanisms for generating an error ID number that have not been described.

In STEP 220, the error ID number is used to search for and to identify an error tool and/or error tool file. For example, if the error ID number "1102" is identified in STEP 205, or generated in STEP 215, this error ID number may be used as a search number for a data repository. Specifically, a data repository may be searched using the error ID number "1102", in order to identify an error tool and/or error tool file. Those skilled in the art will appreciate that, during the error tool search process, the error ID number may be formatted and/or modified. For example, if the error ID number is in a four digit format (i.e. "1102"), but the data repository contains error ID numbers in eight digit formats, then the error ID number may be formatted to be eight digits (i.e. "00001102"). Ultimately, an error tool and/or error tool file will either be identified or will not.

In STEP 225, it is determined if the error tool and/or error tool file exist. If the error tool and/or error tool file do exist, then the process proceeds to STEP 230, otherwise it proceeds to STEP 245.

In STEP 230, a FAQ resource is identified. The FAQ resource may be identified in the case when the error tool and/or error tool file are not identified in STEP 225. For example, the error ID number may be used to search a data repository containing links to FAQ resources, and a specific FAQ resource may be identified from the data repository. The FAQ resource may contain, for example, a detailed description of error 1102, possible causes of error 1102, and possible solutions for repairing error 1102. The possible solutions may contain instructions that a user is to follow and execute in order to repair error 1102, which may include downloading an error tool manually from a network location, installing the error tool manually on a client computer running a software application that contains error 1102, and manually executing the error tool on the client computer to attempt to repair error 1102. Those skilled in the art will appreciate that each of the steps outlined in a possible solutions portion of the FAQ resource (i.e. downloading, installing, and executing an error tool) are performed by a user in a non-automated, manual fashion. Accordingly, they do not follow the set of commands indicated in STEP 200. Those skilled in the art will further appreciate that the FAQ resource may contain various other elements and instructions beyond those described.

In STEP 235, the FAQ resource is transmitted to a client computer. The client computer may be that which is running and/or storing the software application that includes error 1102. The FAQ resource may be transmitted to the client computer using the commands indicated in STEP 200, and therefore may not require user intervention. Upon receiving the FAQ resource, a user may follow the instructions indicated in STEP 230 in an attempt to repair error 1102 in a manual fashion. The FAQ resource may be viewed in a browser or other similar GUI environment by a user of a software application.

In STEP 240, feedback is received from the FAQ resource. For example, if a user followed the instructions in the solutions portion of the FAQ resource, and failed to resolve error 1102, then the user may provide feedback to the FAQ resource including what steps were followed, the success or failure of such steps, any other error messages that occurred after following those steps, any data specific to the software application (e.g. version number, registration number), and any data specific to the user (e.g. contact information such as email address, telephone number, IP address). The user may transmit such feedback to the system through the FAQ resource using a web browser over a network. The feedback may be used by the system to modify and/or update the FAQ resource. For example, the FAQ resource may be amended to incorporate the content of the feedback so that it becomes a more detailed resource as time goes by and multiple feedback is received for the specific error associated with the FAQ resource. Those skilled in the art will appreciate that feedback may include other information that has not been described.

In STEP 245, an error tool is identified based on the error ID number. The error tool (and associated error tool file) may be identified from a data repository containing both the error ID number for error 1102, and the error tool for error 1102. After identification, the error tool file of the error tool may be prepared to be transmitted. Such preparation may include retrieval from a network storage location in the system, deployment in a web server environment, decompressed if in a compressed state, and any other operation typically performed on software files.

In STEP 250, permission to install the error tool on the client computer is requested. Permission may be requested of the user of the software application in which error 1102 occurs. Those skilled in the art will appreciate that permission is not required to install the error tool and/or error tool file on the client computer, and that the installation of the error tool and/or error tool file associated with the error tool may be performed remotely and in a completely automated fashion without the intervention of the user of the software application. In the case when permission to install the error tool on the client computer is requested, it may be sent to the user in the form of an email, SMS, telephone call, popup window in a browser or other GUI, as well as through other mechanisms.

In STEP 255, permission to install the error tool on the client computer is received. As indicated in STEP 250, those skilled in the art will appreciate that permission is not required to install the error tool on the client computer, and that the installation of the error tool and/or error tool file may be performed automatically without the intervention of the user of the software application. In the case where permission is received, the user may send this permission to the system via email, SMS, telephone call, proprietary electronic message in the software application, as well as through other mechanisms. Once the system receives the permission from the user, it may record the permission for future use, and the permission may trigger the transmission of the error tool to the client computer.

In STEP 260, the error tool is transmitted to the client computer. For example, the set of commands carrying out the process (as described in STEP 200) may identify a network address of the client computer, and a file system location on the client computer. The network address is the location in the network of the client computer, and the file system location is a specific location within the file system of the client computer at which to store the error tool file. The identification of the network address and the file system location is performed in a completely automated fashion, without the intervention of the user. After identification of the network address, the error tool file of error tool 1102 is transmitted to the network address of the client computer. This is also performed according to the set of program instructions (i.e. the commands). Transmission may occur over various types of networks (e.g. LAN, WAN, wireless), and may be performed with or without the permission of the user of the software application with error 1102. In one or more embodiments of the invention, the error tool file is transmitted to the client computer without permission of the user such that no steps are required to be performed by the user to repair error 1102.

In STEP 265, the error tool is installed on the client computer. For example, the error tool file of error tool 1102 may be stored on the client computer at the file system location identified in STEP 260. Storage may be performed according to the program commands of the system, without intervention of a user. After storing the error tool file, it may be installed as determined by the commands on the client computer. Installation of the error tool file may include various actions, including expanding compressed files that are part of the error tool file, creating a directory structure in the file system of the client computer in which to expand the error tool file, modifying registry elements of the operating system of the client computer so that the error tool will function in a correct manner upon execution, copying various files that are part of the error tool file into the file system, and restarting the client computer to ensure that the above changes to take effect. Those skilled in the art will appreciate that the completely automated process of installing the error tool may include other actions that have not been described.

In STEP 270, the error tool is executed on the client computer. For example, error tool 1102 may be executed on the client computer after installation. Execution may be performed according to the program commands of the system, without intervention of a user. Execution of the error tool file may include various actions, including identification of the error in the software application, identification of the location of the error in the software application, copying of program code to the location of the error in the software application, modification of program code at the location of the error in the software application, identification of a module in the software application containing the source of the error, installation of a new module in the software application to replace the module containing the source of the error, identification of a missing value in the source code of the software application, copying of a value to replace the missing value in the software application, and numerous other actions to repair the error. Those skilled in the art will appreciate that the completely automated process of executing the error tool may include other actions that have not been described.

In STEP 275, an error is repaired by the error tool. For example, after error tool 1102 is executed in STEP 270, the actions performed during execution of error tool 1102 may repair error 1102. Repairing the error may be performed according to the program commands of the system, without intervention of a user. When an error is repaired, that error ceases to exist. In other words, repairing an error eliminates the flaw, mistake, failure, or fault in the software application that produces the incorrect and/or unexpected result. After repairing the error, the software application functions without the error appearing to the user. Those skilled in the art will appreciate that the completely automated process of repairing the error may include other elements that have not been described.

In STEP 280, feedback is received from the error tool. For example, while executing and repairing error 1102, error tool 1102 may generate an execution log that details the actions and/or results of the execution and repair. This error log may contain code locations, deployments steps, error values, module names, and various other elements that may be used to track the error repair process. After generating this error log, it may be transmitted back to the system as feedback. The feedback may be sent in numerous forms, and may be stored in the system for future use. After receiving the feedback, the system may, for example, store the feedback as part of the error tool, and may adjust or modify the error tool to incorporate the feedback for future use. For instance, the feedback may be linked to the error ID number associated with the error tool. Alternatively, the feedback may be parsed to obtain specific software application component information (e.g. software application ID number, software application version, user ID number), and this component information may be used to update the error tool. The feedback may also be provided to a user of the software application in order to keep the user informed of the repair process. Those skilled in the art will appreciate that the completely automated process of receiving feedback may include other elements that have not been described.

In one or more embodiments of the invention, after the process described in STEPS 200-280, an updated version of an error tool that has been transmitted to, installed on, and executed on a client computer may be identified. The updated version of the error tool may subsequently be transmitted to, installed on, and executed on a client computer, and the error tool (i.e. the old version of the error tool) may be uninstalled from the client computer. Further, an error tool may at some point be retired (i.e. be identified as obsolete and marked for discontinuation). When an error tool is identified for retirement, it may be uninstalled from a client computer in an automated fashion. In some instances, a user and/or software application may request an error tool with a specific release date. When this occurs, this released error tool may be transmitted to, installed on, and executed on a client computer, and the old version of the error tool may be uninstalled from the client computer. Alternatively, an error tool with a release date that is newer than the old version of the error tool may be identified. When this occurs, the newer version of the error tool may be transmitted to, installed on, and executed on a client computer, and the old version of the error tool may be uninstalled from the client computer. Those skilled in the art will appreciate that the system described above has the functionality to resolve errors that only occur to a small subset of the total number of customers (i.e. users) of a specific software application. In other words, the system may resolve errors for specific customers or isolated subsets of customers, and does not need to address the entire user base of the software application when resolving an error. Those skilled in the art will also appreciate that the completely automated process of repairing an error in a software application with an error tool may include other elements that have not been described.

Figure 3A:
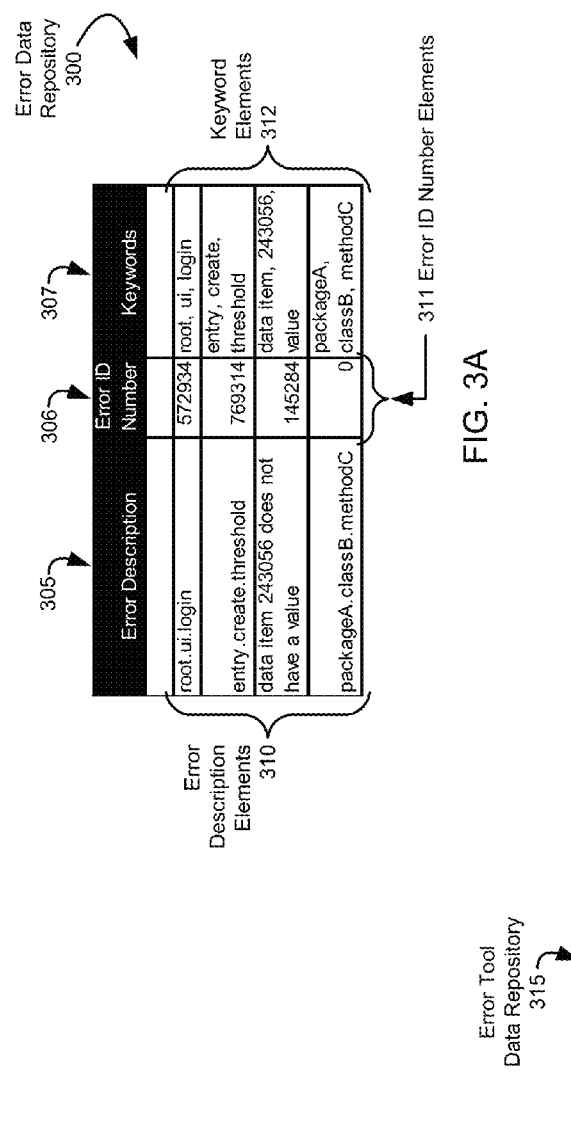
FIGS. 3A, 3B, 4, 5A, and 5B show examples in accordance with one or more embodiments of the invention.

FIG. 3A shows an example in accordance with one or more embodiments of the invention. The example shown in FIG. 3A may demonstrate, for instance, an error data repository stored in system (100). The exemplary error data repository data shown in FIG. 3A may differ among embodiments of the invention, and one or more of the elements of the error data repository may be optional.

In FIG. 3A, error data repository (300) is a data repository that contains data pertinent to errors received by the system. Error data repository (300) may contain data organized as various categories and elements, including categories error description (305), error ID number (306), and keywords (307), and error description elements (310), error ID number elements (311), and keyword elements (312). Error description (305) may be an alphanumeric string that uniquely identifies an error. Error description elements (310) are categorized error descriptions. For example, error description elements (310) may identify an error by specifying its location in program code (e.g. "root.ui.login"), a point or value in program code (e.g. "entry.create.threshold"), the error message displayed to a user when an error occurs (e.g. "data item 243056 does not have a value"), or a location in a class hierarchy ("packageA.classB.methodC"). Those skilled in the art will appreciate that error description elements may encompass various other types of error descriptions beyond those disclosed.

In one or more embodiments of the invention, error ID number (306) may be an alphanumeric code used to uniquely identify an error tool. Error ID number elements (311) are categorized error ID numbers. For example, error ID number elements "572934", "769314", and "145284" may be error ID numbers that uniquely identify error tools that fix errors related to error description elements (310) in a software application. Error ID number element "0" may indicate that an error tool does not exist for a specified error. Those skilled in the art will appreciate that error ID number elements may include various other types of error ID numbers beyond those disclosed.

In one or more embodiments of the invention, keywords (307) may include words, phrases, numbers, and other identifying elements related to errors. Keyword elements (312) are categorized keywords. For example, keyword elements (312) may include the keywords "root", "ui", and "login" for the error description element "root.ui.login", the keywords "entry", "create", and "threshold" for the error description element "entry.create.threshold", the keywords "data item", "243056", and "value" for the error description element "data item 243056 does not have a value", and the keywords "packageA", "classB", and "methodC" for the error description element "packageA.classB.methodC". In other words, keywords may be used by the system to index descriptions of errors, and may be used as metadata for other functionality.

Those skilled in the art will appreciate that error data repository (300) may contain various other types of data beyond those disclosed.

Figure 3B:
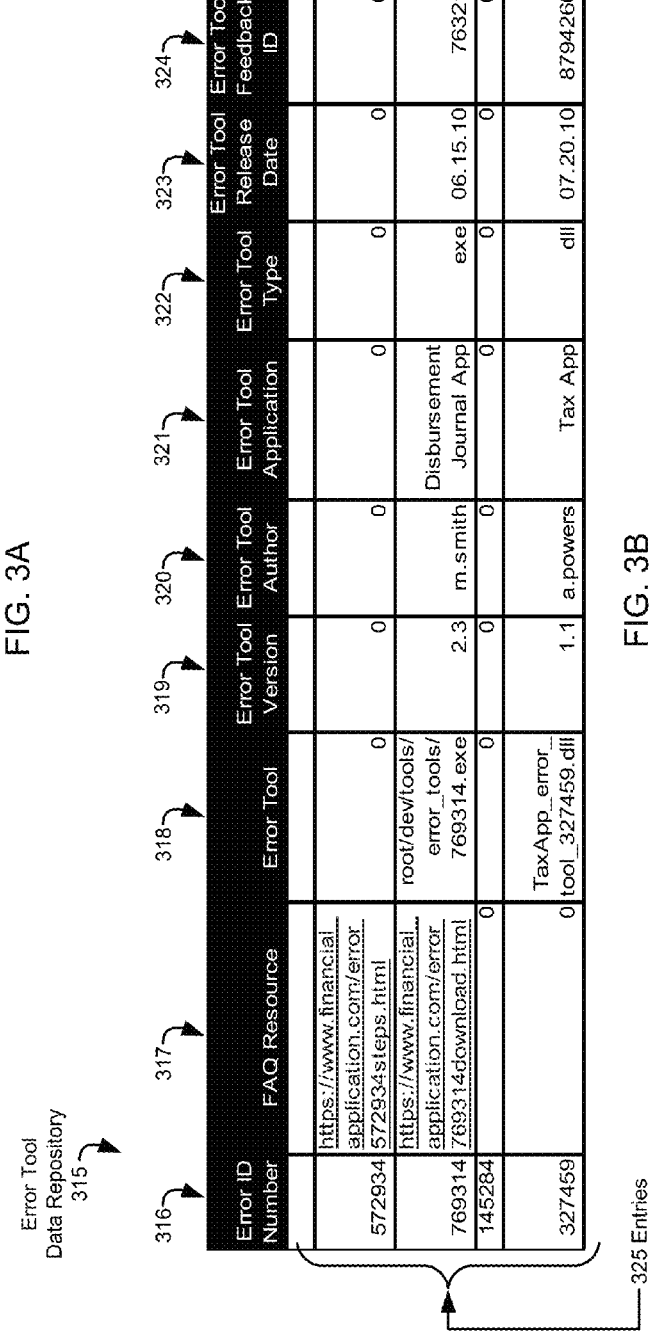

FIG. 3B shows an example in accordance with one or more embodiments of the invention. The example shown in FIG. 3B may demonstrate, for instance, an error tool data repository stored in system (100). The exemplary error tool data repository data shown in FIG. 3B may differ among embodiments of the invention, and one or more of the elements of the error tool data repository may be optional.

In FIG. 3B, error tool data repository (315) is a data repository that contains data pertinent to error tools. Error tool data repository (315) may contain data organized as various categories and entries, including categories error ID number (316), FAQ resource (317), error tool (318), error tool version (319), error tool author (320), error tool application (321), error tool type (322), error tool release date (323), and error tool feedback ID (324). Those skilled in the art will appreciate that each of the categories may contain various types of data, and that an entry of "0" may indicate that no data exists for that particular entry. Error ID number (316) may be an alphanumeric code used to uniquely identify an error tool. In one or more embodiments of the invention, error ID number (316) represents the same element as error ID number (306) in error data repository (300). FAQ resource (317) may be an alphanumeric string used to uniquely identify the location of a FAQ resource. For example, FAQ resource (317) may include the web page universal resource locator (URL) "https://www.financialapplication.com/error572934steps.html". This secure web link may identify the location of a FAQ resource related to an error with error ID number 572934.

In one or more embodiments of the invention, error tool (318) may be an alphanumeric string used to uniquely identify an error tool. For example, the error tool string "root/dev/tools/error_tools/769314.exe" may identify a relative directory location of an error tool with the error ID number 769314. Error tool version (319) may be an alphanumeric string used to uniquely identify an error tool version. For example, the error tool version "2.3" may identify the version of an error tool that most likely is not the first version of the tool (as generally accepted versioning protocol usually labels first versions of an application with a 1.X). Error tool author (320) may be a string used to uniquely identify the author of an error tool. For example, the error tool author string "m.smith" may indicate that a developer with the login of "m.smith" was the author of a particular error tool. Error tool application (321) may be a string used to uniquely identify an application that an error tool is engineered to be used with. For example, the error tool application string "Tax App" may indicate that a software application called "Tax App" is the application that an error tool is engineered to be used with.

In one or more embodiments of the invention, error tool type (322) may be an alphanumeric string used to uniquely identify a type of file used by the error tool. For example, the error tool type "exe" may indicate that an error tool is delivered to a client computer as an executable file, whereas the error tool type "dll" may indicate that an error tool is delivered to a client computer as a dynamic linked library file. Error tool release date (323) may be a Gregorian date used to uniquely identify the date that an error tool was released. For example, error tool release date "06.15.10" may indicate that a particular error tool was released on Jun. 15, 2010. Error tool feedback ID (324) may be an alphanumeric string used to uniquely identify feedback received for and related to an error tool and/or FAQ resource. For example, error tool feedback ID "8794266" may identify feedback for an error tool relating to a tax application. Error tool data repository (315) may contain various entries that are categorized according to categories (316)-(324). For example, entries (325) may relate to various error tools and FAQ resources. An exemplary entry may contain the following data: error ID number "769314", FAQ resource "https://financialapplication.com/error769314download.html", error tool "root/dev/tools/error_tools/769314.exe", error tool version "2.3", error tool author "m.smith", error tool application "Disbursement Journal App", error tool type "exe", error tool release date "06.15.10", and error tool feedback ID "76321". Those skilled in the art will appreciate that there may be numerous other types of entries containing data not shown in FIG. 3B.

Figure 4:
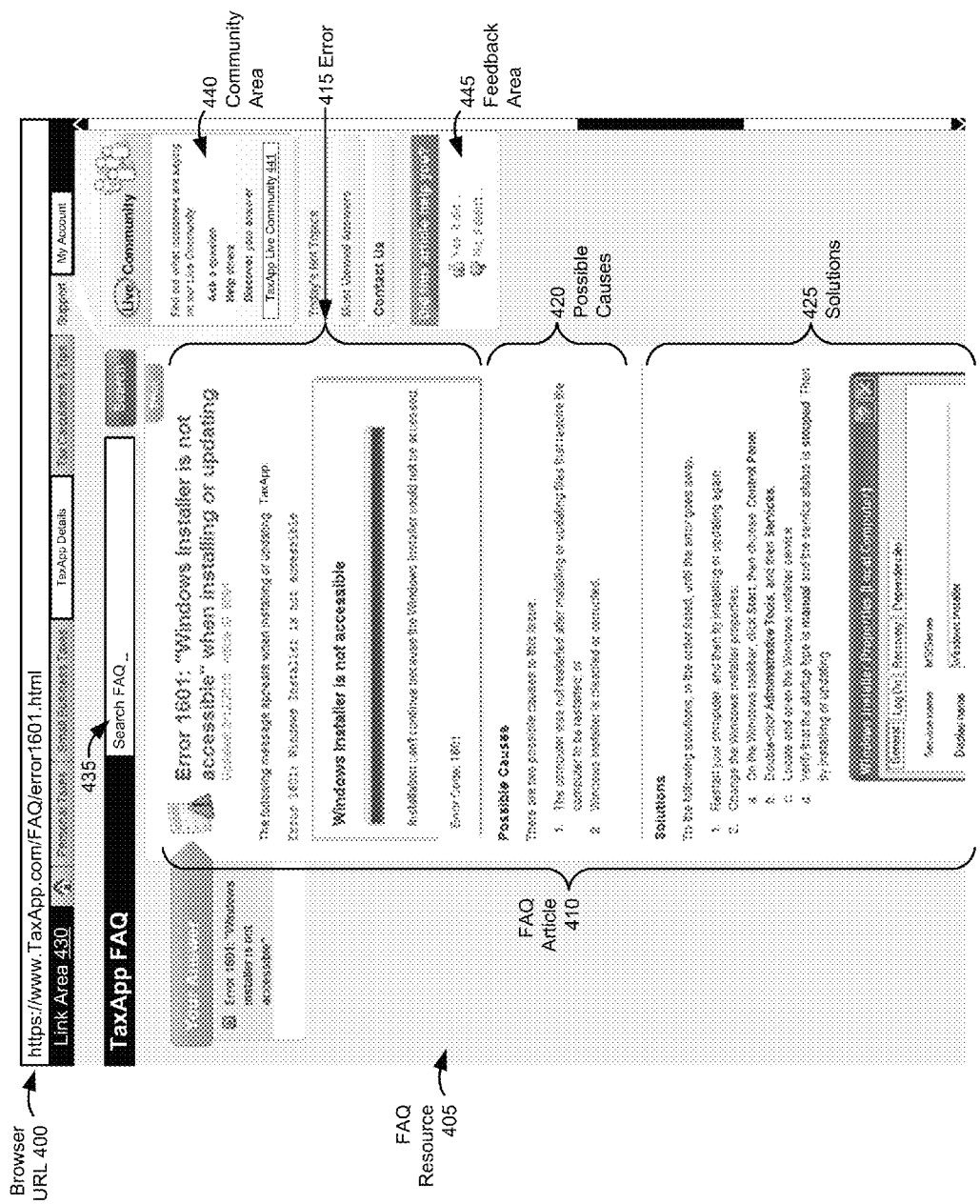

FIG. 4 shows an example in accordance with one or more embodiments of the invention. The example shown in FIG. 4 may demonstrate, for instance, a FAQ resource of system (100). The example shown in FIG. 4 may differ among embodiments of the invention, and one or more of the elements of the FAQ resource may be optional.

In FIG. 4, FAQ resource (405) is shown in a browser with browser URL (400). FAQ resource (405) may, therefore, be a web page or other online document. Browser URL (400) may be a link to the web page (e.g. https://www.TaxApp.com/FAQ/error1601.html). Browser URL (400) may link to a secure website (hence the use of hypertext transfer protocol secure, or https). Browser URL (400) may relate to a specific type of software application by referencing a domain of a financial application (e.g. www.TaxApp.com). Browser URL (400) may further identify a FAQ resource specific to a particular error by referencing specific sub-domains pertaining to the error (e.g. /FAQ/error1601.html). In this case, a FAQ resource that relates to error 1601 is identified by Browser URL (400).

FAQ resource (405) is a resource used to help a user fix an error in a software application. In this case, FAQ resource (405) is a resource that pertains to an error in the "TaxApp" application. FAQ resource (405) may contain various portions, including FAQ article (410) (containing error (415), possible causes (420), and solutions (425)), link area (430), search box (435), community area (440), and feedback area (445).

In one or more embodiments of the invention, FAQ article (410) is an article that includes an example of the error associated with the FAQ resource, possible causes of the error, and potential solutions to fix the error. Specifically, error (415) may indicate the error identified in the software application. Error (415) may include, for example, the identification number and string of the error (e.g. "Error 1601: Windows Installer is not accessible when installing or updating"), a Gregorian date when FAQ article (410) was last updated (e.g. "Updated: Feb. 12, 2010"), an article identification number (e.g. "Article ID: 5091"), an identification of the software application (e.g. "The following message appears when installing or updating TaxApp"), and an image of the error message that is displayed in the software application (e.g. an image displaying the message "Windows Installer is not accessible. Installation can't continue because the Windows Installer could not be accessed. Error Code: 1601"), In one or more embodiments of the invention, possible causes (420) indicates potential sources of the error. For example, possible causes (420) may include a list of potential sources of the error (e.g. "There are two possible causes to this issue: 1. The computer was not restarted after installing or updating files that require the computer to be restarted; or 2. Windows Installer is disabled or corrupted."). Possible causes (420) may also have hyperlinks to other web pages that may describe in further detail potential sources of the error. Those skilled in the art will appreciate that there may be various other elements in possible causes (420) not described.

In one or more embodiments of the invention, solutions (425) indicates potential solutions to fix the error. For example, solutions (425) may include an ordered list of fixes for a user to attempt (e.g. "Try the following solutions, in the order listed, until the error goes away. 1. Restart your computer, and then try installing or updating again. 2. Change the Windows Installer properties: a. On the Windows taskbar, click Start, then choose Control Panel. b. Double-click Administrative Tools, and then Services. c. Locate and open the Windows Installer service. d. Verify that the startup type is manual and the service status is stopped. Then try installing or updating."). Solutions (425) may further include an image of the relevant portions of the operating system to modify at steps 1. and 2. as relating to the ordered list of fixes. Those skilled in the art will appreciate that there may be various other elements of solutions (425) that have not been described.

In one or more embodiments of the invention, link area (430) includes various links to web pages. For example, link area (430) may contain a home link (e.g. the home page of the web site containing the FAQ resource), a link to a web page that contains information about a user's personal taxes, a link to a web page that contains information about a user's small business taxes, a link to a web page that contains information about the software application (e.g. "TaxApp Details"), a link to a web page that contains information about tax calculators and tips, a link to a support web page, as well as a link to a web page that contains information about a user's account (e.g. "My Account"). Those skilled in the art will appreciate that there may be various other links to numerous other web pages that have not been described.

In one or more embodiments of the invention, search box (435) is a user interface element that allows a user to access a search engine. For example, search box (435) may allow a user to search through the hierarchy of the entire web site for a term or multiple terms using a search string. In other words, a user may search the "www.TaxApp.com" domain for terms pertaining to the error specified by browser URL (400), or other errors. For instance, the search string "error 1700 value does not exist", when entered into search box (435), and submitted by clicking on the search button located adjacent to the search box, may perform a search of the website for error 1700, and the error message "value does not exist". Those skilled in the art will appreciate that there may be various other uses for search box (435) that have not been described.

In one or more embodiments of the invention, community area (440) allows a user to interact with and use other users as resources. For example, community area (440) may include the following functionalities: posting a question to other users (e.g. "ask a question"), posting an answer to other users (e.g. "help others"), and conducting an interactive chat with other users (e.g. "discover your answer"). Other functionalities relating to the community of users of the software application may be accessed via the TaxApp Live Community (441) button. Those skilled in the art will appreciate that there may be various other functionalities of the community area (440) that have not been described.

In one or more embodiments of the invention, feedback area (445) allows a user to input feedback to the system. For example, feedback area (445) may include a question (e.g. "Did this article help you?"), and several choices that a user may select in response to the question (e.g. "Yes, it did . . . ", or "No, it didn't . . . "). When a user selects one of the feedback responses, the FAQ resource may send this selection to the system, in order to make the system more efficient. Beyond feedback area (445), FAQ resource (405) may include various other functionalities, such as a link to a message board containing message threads that may be relevant to the error the user is facing (e.g. "today's hot topics), a link to answers from the community that are most viewed (e.g. "most viewed answers"), a link that allows a user to contact a system administrator of FAQ resource (405) via email, telephone, or another medium (e.g. "contact us"), and a button that allows a user to print FAQ resource (405). Those skilled in the art will appreciate that there may be numerous other functionalities of FAQ resource (405) that have not been described.

Figure 5A:
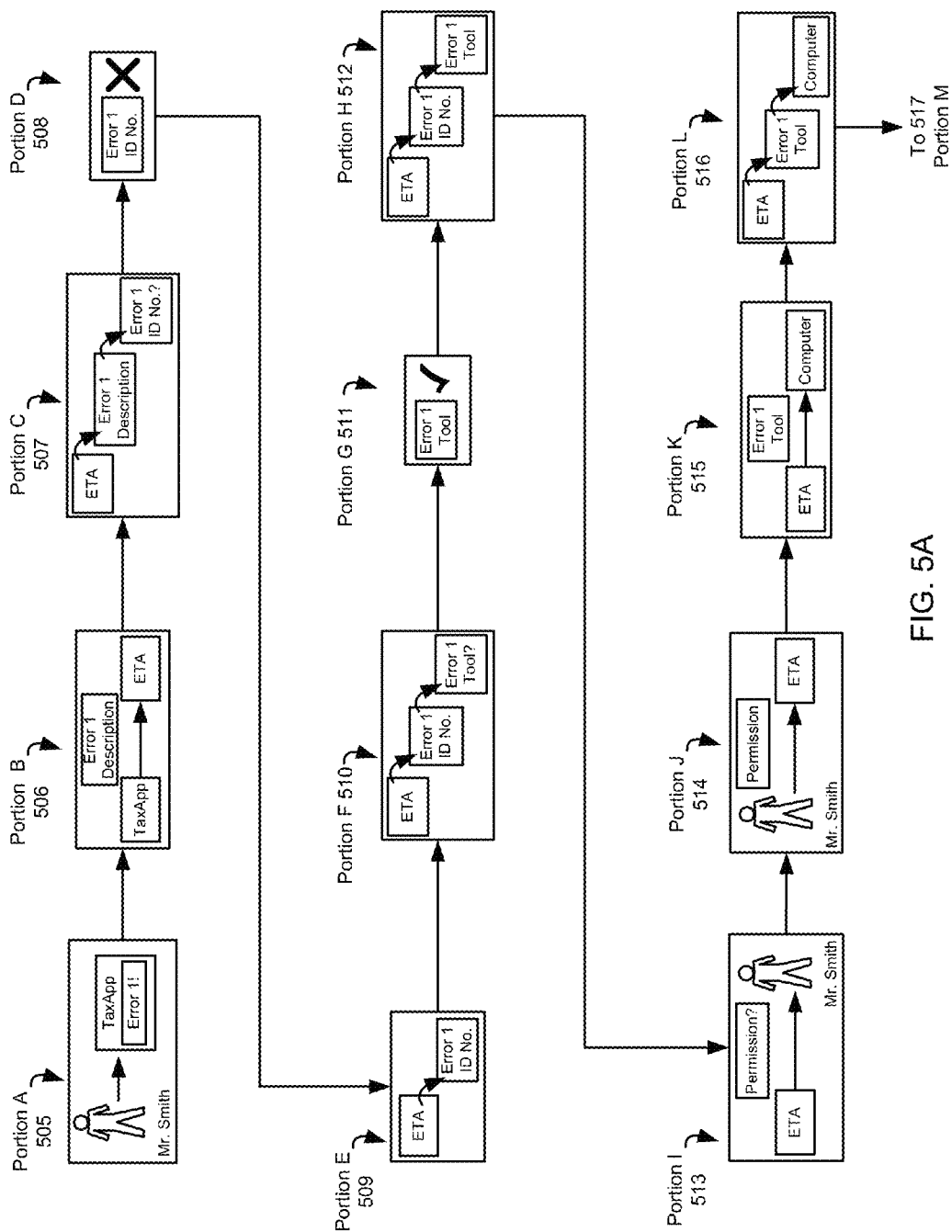

FIG. 5A shows an example in accordance with one or more embodiments of the invention. The example shown in FIG. 5A may illustrate, for instance, the process implemented to repair an error in a software application. The example shown in FIG. 5A may differ among embodiments of the invention, and one or more of the portions may be optional.

In portion A (505), Mr. Smith attempts to install a tax application (i.e. "TaxApp") on a client computer, and encounters a windows installer error (i.e. "error 1"). The windows installer error may, for example, not allow the installation of the TaxApp on the client computer.

In portion B (506), the TaxApp sends a description of error 1 to an error tool application (i.e. "ETA"). The description may be, for instance, "windows installer error 1500; cannot install TaxApp". Other information associated with error 1 may also be sent to the ETA, including the an identification of the location of error 1 in the TaxApp, an identification of the module within which error 1 occurs in the TaxApp, an identification of the operating system being used on the client computer, and an identification of the software environment on the client computer.

In portion C (507), the ETA looks up the error 1 description to identify an error ID number. For instance, the ETA may use the error 1 description "windows installer error 1500; cannot install TaxApp" to attempt to identify the error 1 ID number.

In portion D (508), the ETA determines that the error 1 ID number does not exist in the system. In certain instances, the error ID numbers of errors may not exist in the system, even if error tools for the errors do exist.

In portion E (509), the ETA generates an error ID number for error 1. The error ID number (i.e. error 1 ID number) may be generated using various methods such as by a pseudo random number generator, by using details from the error description sent in portion B, by using details of other error components sent to the ETA, or another framework.

In portion F (510), the ETA looks up the generated error 1 ID number to identify an error tool for error 1 (i.e. "error 1 tool"). For example, the windows installer error 1500 error tool (i.e. error 1 tool) may be looked up.

In portion G (511), the ETA determines that the error 1 tool exists. The error 1 tool may exist in conjunction with other error tools, as well as other versions of the same error tool.

In portion H (512), the ETA identifies the error 1 tool based on the error 1 ID number. The identification of the error 1 tool may include the selection of the error 1 tool from a group of error tools, or a group of different versions of the same error tool.

In portion I (513), the ETA requests permission from Mr. Smith to install the error 1 tool on a client computer that runs the TaxApp. The request may be sent over a network in the form of an email, SMS, text message, or other mechanism. Those skilled in the art will appreciate that the request for permission to install an error tool is merely an example of the functionality of the ETA, and that requesting permission is not required to perform the process of repairing an error in a software application. Those skilled in the art will appreciate that the error tool may be installed in a completely automated fashion without intervention of the user of the software application.

In portion J (514), Mr. Smith provides permission to install the error 1 tool on the client computer. The permission may be sent over a network in the form of an email, SMS, text message, or other mechanism. As described above, those skilled in the art will appreciate that receiving permission to install an error tool is merely an example of the functionality of the ETA, and that receiving permission is not required to perform the process of repairing an error in a software application. Those skilled in the art will appreciate that the error tool may be installed by following a set of program commands issued by the ETA, without involvement of the user of a software application.

In portion K (515), the ETA transmits the error 1 tool to the client computer. The transmission of the error 1 tool (specifically a file of the error 1 tool) may include the identification of a network address of the client computer, as well as the identification of a file system location on the computer. The error 1 tool may be transmitted over a network (e.g. the Internet) to the network address of the client computer.

In portion L (516), the ETA installs the error 1 tool on the client computer. The installation may include saving the error 1 tool file at the file system location identified in portion K. Installation may also include unpacking compressed files in the error 1 tool file, creating a directory structure in the file system of the client computer in which to expand the error 1 tool file, modifying registry elements of the operating system of the client computer so that the error 1 tool will function in a correct manner upon execution, copying various files that are part of the error 1 tool file into the file system, and restarting the client computer to ensure that the above changes to take effect.

Figure 5B:
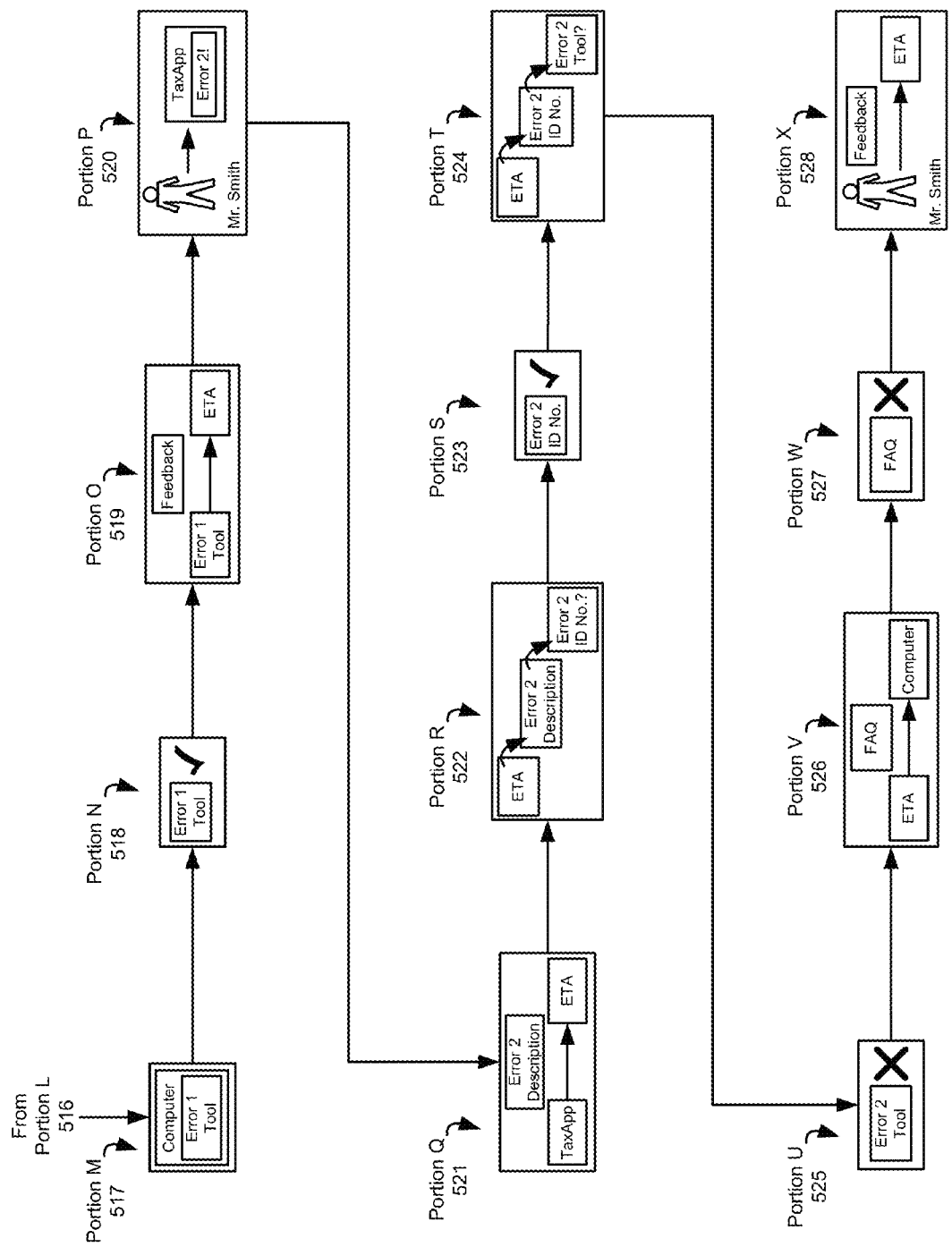

FIG. 5B shows an example in accordance with one or more embodiments of the invention. The example shown in FIG. 5B may illustrate, for instance, the process implemented to repair an error in a software application. The example shown in FIG. 5B may differ among embodiments of the invention, and one or more of the portions may be optional.

In portion M (517), the ETA executes the error 1 tool on the client computer. Execution of the error 1 tool may be performed, for example, according to the program commands of the system, without intervention of the user of the TaxApp. Execution of the error 1 tool file may include various actions, including identification of error 1 in the TaxApp, identification of the location of error 1 in the TaxApp, copying of program code to the location of error 1 in the TaxApp, modification of program code at the location of error 1 in the TaxApp, identification of a module in the TaxApp containing the source of error 1, installation of a new module in the TaxApp to replace the module containing the source of error 1, identification of a missing value in the source code of the TaxApp, copying of a value to replace the missing value in the TaxApp, and numerous other actions to repair error 1. Those skilled in the art will appreciate that the completely automated process of executing the error 1 tool to repair error 1 in the TaxApp may include other actions that have not been described.

In portion N (518), the error 1 tool fixes error 1. In other words, error 1 does not exist after the error 1 tool executes and performs the repair. Now Mr. Smith can install the TaxApp without encountering error 1.

In portion O (519), the error 1 tool sends feedback to the ETA. The feedback may be in the form of an error log that contains the version of the error 1 tool, the version of the TaxApp, the file system location of the client computer where the error 1 tool was installed, the network address of the client computer where the error 1 tool was transmitted, and various other information relating to error 1, the TaxApp, and the error 1 tool. After receiving the feedback, the ETA may incorporate the feedback into the error 1 tool, in order to make future repairs of error 1 for other users more efficient.

In portion P (520), Mr. Smith encounters a directory permissions error (i.e. "error 2"). The directory permissions error may, for example, not allow the access of a specific directory in the file system of the client computer by the TaxApp.

In portion Q (521), the TaxApp sends a description of error 2 to the ETA. The description of error 2 may be, for instance, "directory permissions error 2000; TaxApp cannot access directory A". Other information associated with error 2 may also be sent to the ETA, including the an identification of the location of error 2 in the TaxApp, an identification of the module within which error 2 occurs in the TaxApp, an identification of the operating system being used on the client computer, an identification of the software environment on the client computer, and the location in the file system of the directory that TaxApp cannot access.

In portion R (522), the ETA looks up the error 2 description to identify an error 2 ID number. For instance, the ETA may use the error 2 description "directory permissions error 2000; TaxApp cannot access directory A" to attempt to identify the error 2 ID number.

In portion S (523), the ETA determines that the error 2 ID number exists. Error 2 ID number may exist, for instance, among a group of error ID numbers associated with various errors.

In portion T (524), the ETA looks up the error 2 ID number to attempt to identify an error tool for error 2 (i.e. "error 2 tool"). For example, the directory permissions error 2000 error tool may be looked up.

In portion U (525), the ETA determines that the error 2 tool does not exist. This may occur if, for example, an automated error tool has not been developed to address error 2. In the case where an error tool does not exist, the ETA may identify a FAQ resource that may be sent to a user in the place of an error tool. Therefore, instead of an automated error tool that repairs the error without the intervention of a user, the user may use a FAQ resource to manually attempt to fix the error.

In portion V (526), the ETA sends the FAQ resource to the client computer and to Mr. Smith. The FAQ resource may contain, for example, a detailed description of error 2000, possible causes of error 2000, and possible solutions for repairing error 2000. The possible solutions may contain instructions that a user is to follow and execute in order to repair error 2000, which may include downloading an error tool manually from a network location, installing the error tool manually on a client computer running the TaxApp that contains error 2000, and manually executing the error tool on the client computer to attempt to repair error 2000.

In portion W (527), Mr. Smith attempts the steps outlined in the FAQ resource, and fails to fix error 2. Those skilled in the art will appreciate that each of the steps outlined in the possible solutions portion of the FAQ resource (i.e. downloading, installing, and executing a manual error tool) are performed by Mr. Smith in a non-automated, manual fashion. Accordingly, they do not follow the set of commands executed by the ETA.

In portion X (528), Mr. Smith sends feedback to the ETA using the FAQ resource. For example, Mr. Smith may provide feedback to the FAQ resource including what steps were followed in the attempt to fix error 2000, the success or failure of such steps, any other error messages that occurred after following those steps, any data specific to the TaxApp (e.g.

TaxApp version number, TaxApp registration number), and any data specific to Mr. Smith (e.g. contact information such as Mr. Smith's email address, Mr. Smith's telephone number, Mr. Smith's IP address). Mr. Smith may transmit this feedback to the ETA through the FAQ resource using a web browser over a network. The feedback may be used by the ETA to modify and/or update the FAQ resource. For example, the FAQ resource may be amended to incorporate the content of Mr. Smith's feedback so that it becomes a more detailed resource as time goes by and multiple feedback is received (from Mr. Smith and other users) for error 2000. Those skilled in the art will appreciate that portions A-X are exemplary, and that various other portions may be included detailing different functionality than that which has been described.

Figure 6:
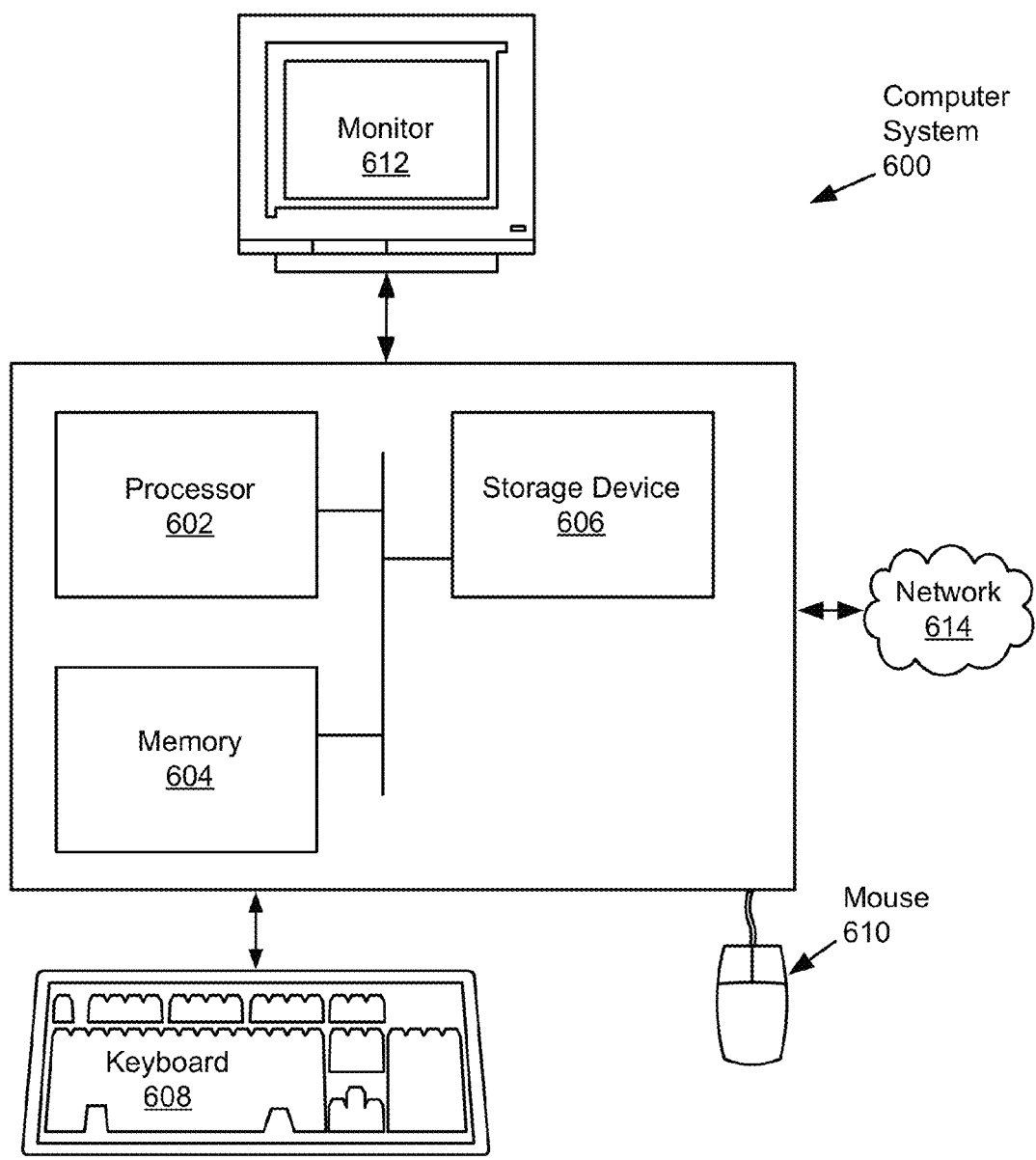
FIG. 6 shows a computer system in accordance with one or more embodiments of the invention.

Embodiments of the invention may be implemented on virtually any type of computer regardless of the platform being used. For example, as shown in FIG. 6, computer system (600) includes one or more processor(s) (602) such as an integrated circuit, a central processing unit (CPU), or other hardware processor, associated memory (604) (e.g. random access memory (RAM), cache memory, flash memory, etc.), storage device (606) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (602) is hardware. For example, the processor may be an integrated circuit. The computer system (600) may also include input means, such as keyboard (608), mouse (610), or a microphone (not shown). Further, computer system (600) may include output means, such as monitor (612) (e.g. a liquid crystal display (LCD), a plasma display, or cathode ray tube (CRT) monitor). The computer system (600) may be connected to network (614) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g. error tool application, error detection engine, error search engine, error ID number search engine, FAQ engine, transmission engine, installation engine, execution engine, and feedback engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for repairing an error in a software application, comprising:
    identifying a plurality of commands for repairing the error;
    receiving, from a client computer executing the software application, the error comprising an error description detailing the error;
    searching, using a processor and the plurality of commands, for the error description to identify a specific error identification (ID) number from a plurality of error ID numbers that categorize the error, wherein each error ID number of the plurality of error ID numbers identifies a respective error tool;
    selecting, using the processor and based on the specific error ID, an error tool that repairs the error;
    transmitting, using the plurality of commands, the error tool to the client computer;
    storing, using the plurality of commands, the error tool on the client computer;
    installing, using the plurality of commands, the error tool on the client computer;
    repairing the error in the software application by executing the error tool;
    receiving, automatically, feedback in the form of an execution log from the error tool;
    extracting error data from the execution log;
    parsing the error data to identify a software application component information; and
    updating, automatically, the error tool based on the software application component information.

2. The method of claim 1, further comprising:
    determining that the specific error ID number does not exist; and
    generating the specific error ID number.

3. The method of claim 1, further comprising:
    determining that the error tool does not exist;
    identifying a frequently asked questions (FAQ) resource;
    transmitting the FAQ resource to the client computer; and
    receiving FAQ feedback from the FAQ resource.

4. The method of claim 1, further comprising:
    updating a frequently asked questions (FAQ) resource based on the feedback.

5. The method of claim 1, further comprising:
    requesting permission to install the error tool on the client computer; and
    receiving permission to install the error tool on the client computer.

6. The method of claim 1, further comprising:
    identifying an updated version of the error tool after executing the error tool;
    transmitting, using the plurality of commands, the updated version of the error tool to the client computer;
    uninstalling, using the plurality of commands, the error tool from the client computer;
    installing, using the plurality of commands, the updated version of the error tool on the client computer; and
    executing, using the plurality of commands, the updated version of the error tool on the client computer.

7. The method of claim 1, further comprising:
    retiring the error tool after executing the error tool; and
    uninstalling, using the plurality of commands, the error tool from the client computer.

8. The method of claim 1, further comprising:
receiving a request for a released error tool with a specified release date;
transmitting, using the plurality of commands, the released error tool to the client computer;
uninstalling, using the plurality of commands, the error tool from the client computer;
installing, using the plurality of commands, the released error tool on the client computer; and
executing, using the plurality of commands, the released error tool on the client computer.

9. The method of claim 1, further comprising:
installing the error tool in the software application.

10. The method of claim 1, further comprising:
linking the feedback to the specific error ID number.

11. The method of claim 1, wherein the error affects a single user of a plurality of users, and wherein the error tool is used to fix the error for the single user.

12. The method of claim 1, wherein the software application is a financial application.

13. The method of claim 1, further comprising:
obtaining an empty result set in response to searching for the error description;
extracting a plurality of keywords from the error description; and
searching for the plurality of keywords to identify a closest matching error description containing the plurality of keywords.

14. The method of claim 1, further comprising:
identifying an alternative error tool that repairs the error;
comparing a release date of the error tool with an alternative release date of the alternative error tool; and
selecting the error tool based on the release date occurring after the alternative release date.

15. A system for repairing an error in a software application, comprising:
a processor; and
an error tool application executing on the processor and configured to:
identify a plurality of commands for repairing the error;
receive, from a client computer executing the software application, the error comprising an error description detailing the error;
search, using the plurality of commands, for the error description to identify a specific error identification (ID) number from a plurality of error ID numbers that categorize the error, wherein each error ID number of the plurality of error ID numbers identifies a respective error tool;
select, based on the specific error ID, an error tool that repairs the error;
transmit, using the plurality of commands, the error tool to the client computer;
store, using the plurality of commands, the error tool on the client computer;
install, using the plurality of commands, the error tool on the client computer;
repair the error in the software application by executing the error tool;
receive, automatically, feedback in the form of an execution log from the error tool;
extract error data from the execution log;
parse the error data to identify a software application component information; and
update, automatically, the error tool based on the software application component information.

16. The system of claim 15, further comprising:
an error search engine configured to:
determine that the specific error ID number does not exist, and
generate the specific error ID number.

17. The system of claim 15,
further comprising an error ID number search engine configured to determine that the error tool does not exist;
further comprising a frequently asked questions (FAQ) engine configured to:
identify a FAQ resource, and
transmit the FAQ resource to the client computer; and
further comprising a feedback engine configured to receive FAQ feedback from the FAQ resource.

18. The system of claim 15,
further comprising an error ID number search engine configured to identify an updated version of the error tool after executing the error tool;
further comprising a transmission engine configured to transmit, using the plurality of commands, the updated version of the error tool to the client computer;
further comprising an installation engine configured to:
uninstall, using the plurality of commands, the error tool from the client computer, and
install, using the plurality of commands, the updated version of the error tool on the client computer; and
further comprising an execution engine configured to execute, using the plurality of commands, the updated version of the error tool on the client computer.

19. The system of claim 15, further comprising:
a feedback engine configured to link the feedback to the specific error ID number.

20. The system of claim 15, wherein the software application is a financial application.

21. A non-transitory computer readable storage medium storing instructions for repairing an error in a software application, the instructions executable on a processor and comprising functionality for:
identifying a plurality of commands for repairing the error;
receiving, from a client computer executing the software application, the error comprising an error description detailing the error;
searching, using the plurality of commands, for the error description to identify a specific error identification (ID) number from a plurality of error ID numbers that categorize the error, wherein each error ID number of the plurality of error ID numbers identifies a respective error tool;
selecting, based on the specific error ID, an error tool that repairs the error;
transmitting, using the plurality of commands, the error tool to the client computer;
storing, using the plurality of commands, the error tool on the client computer;
installing, using the plurality of commands, the error tool on the client computer;
repairing the error in the software application by executing the error tool;
receiving, automatically, feedback in the form of an execution log from the error tool;
extracting error data from the execution log;
parsing the error data to identify software application component information; and
updating, automatically, the error tool based on the software application component information.

22. The non-transitory computer readable storage medium of claim 21, the instructions further comprising functionality for:
  determining that the specific error ID number does not exist; and
  generating the specific error ID number.

23. The non-transitory computer readable storage medium of claim 21, wherein the software application is a financial application.

24. The non-transitory computer readable storage medium of claim 21, the instructions further comprising functionality for:
  determining that the error tool does not exist;
  identifying a frequently asked questions (FAQ) resource;
  transmitting the FAQ resource to the client computer; and
  receiving FAQ feedback from the FAQ resource.

25. The non-transitory computer readable storage medium of claim 21, the instructions further comprising functionality for:
  identifying an updated version of the error tool after executing the error tool;
  transmitting, using the plurality of commands, the updated version of the error tool to the client computer;
  uninstalling, using the plurality of commands, the error tool from the client computer;
  installing, using the plurality of commands, the updated version of the error tool on the client computer; and
  executing, using the plurality of commands, the updated version of the error tool on the client computer.

* * * * *